JAMES H. BUTLER.
Improvement in Lath Machines.
No. 124,034.  Patented Feb. 27, 1872.
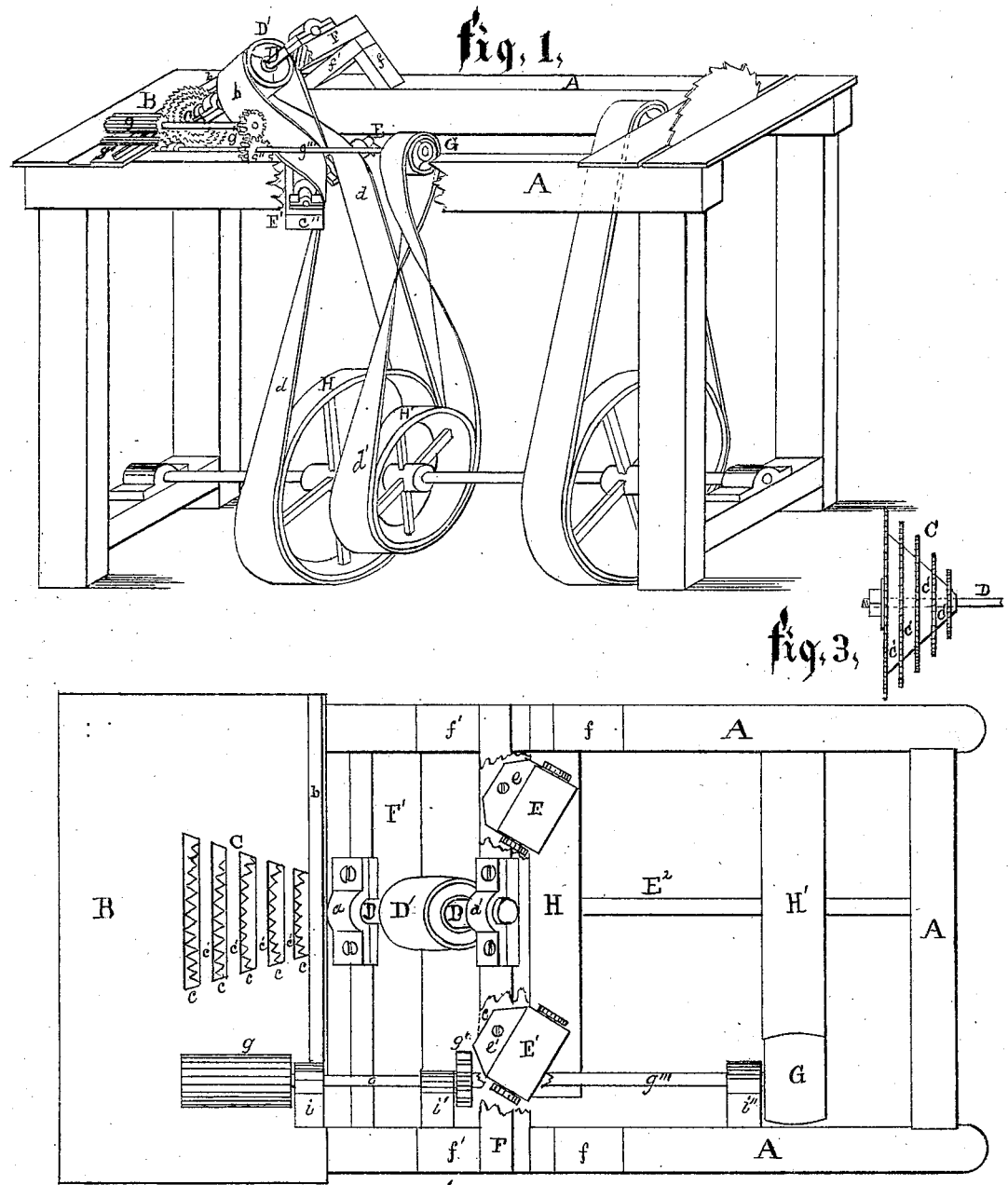

124,034

UNITED STATES PATENT OFFICE.

JAMES H. BUTLER, OF HAMPDEN, MAINE.

IMPROVEMENT IN LATH-MACHINES.

Specification forming part of Letters Patent No. 124,034, dated February 27, 1872.

Specification of an Improvement in Lath-Machines invented by JAMES H. BUTLER, of Hampden, in the county of Penobscot and State of Maine.

This invention relates to the manner of running a series of gang-saws on an inclined arbor by a belt from a horizontal drum and shaft, said saws being secured on the arbor by conical collars so arranged on a line parallel with the plane of the feed-table, that the saw-blades shall have an even support on each side; all of which will be more fully hereinafter described.

In the accompanying drawing, Figure 1 is a perspective view of the whole machine on a table, having at the other end a cut-off saw. Fig. 2 is a plan view showing the turning or lead rollers for the band. Fig. 3 is a section of the saws and arbor, showing the conical collars.

A is the main frame of the table, made to suit the work to be executed. B is the table on which the blocks are to be sawed into laths. C represents the gang of saws, and C' the collars of a conical form. D is the arbor on which is fastened the saws C, and the small pulley D'. E and $E^1$ are "turning" rollers by which the belt $d$ is led off from and onto the small pulley D' from driving-pulley H. F is the horizontal beam on which the upper end of the arbor D is journaled. F' is a cross-beam below, on which the lower end is journaled. G is a small pulley on the end of the feed-roller shaft $g'''$, taking its motion from pulley H' on the main shaft $E^2$ by a twisted belt to give the proper direction to the feed toward the saws. H and H' are driving-pulleys on the main-shaft $E^2$. $a$ and $a'$ are the journal-boxes for the arbor D. $b$ is the guide strip on the feed-table, having its inner edge beveled off to match the bevel of the saws, and thus bear evenly on the edge of the lath. $c''$ is a cross-beam under the rails to support the brackets which hold the rollers E and $E^1$. $d$ is the belt to drive the saws, and $d'$ the belt reversed to drive the feed-rollers $g$ $g'$. $e$ and $e'$ are the pivot-screws holding the brackets of E and $E^1$ on the cross-beam $c''$. $f$ and $f'$ are the brackets sustaining the cross-piece F. $g$ and $g'$ are the feed-rollers on the shafts $h$ and $g'''$, which are supported in bearings $i$ $i'$ and $i''$, and on them are the gear-wheels $g'$ and $g''$. The beam F is represented as broken to show the brackets and rollers E and $E^1$, and pivots $e$ and $e'$. Motion being given to the main-shaft $E^2$, the belt $d$ will drive the saws toward the feed-rollers, while belt $d'$, being reversed, will feed the rollers toward the saws. The "turning" rollers E and $E^1$ will lead the belt $d$ fair to and from the pulley D'.

Having fully described this invention, what I claim is—

The combination of the gang-saws C, inclined arbor D, conical collars C', driving inclined belt $d$, horizontal shaft $E^2$, and feed-rollers $g$ $g'$, all constructed and arranged substantially as and for the purpose described.

This specification signed by me at Washington, D. C., this 19th day of December, 1871.

JAMES H. BUTLER.

Witnesses:
 WM. R. SINGLETON,
 C. D. IRELAN.